March 27, 1928.
J. W. BLACKMAN
TRELLIS
Filed March 18, 1927
1,664,019
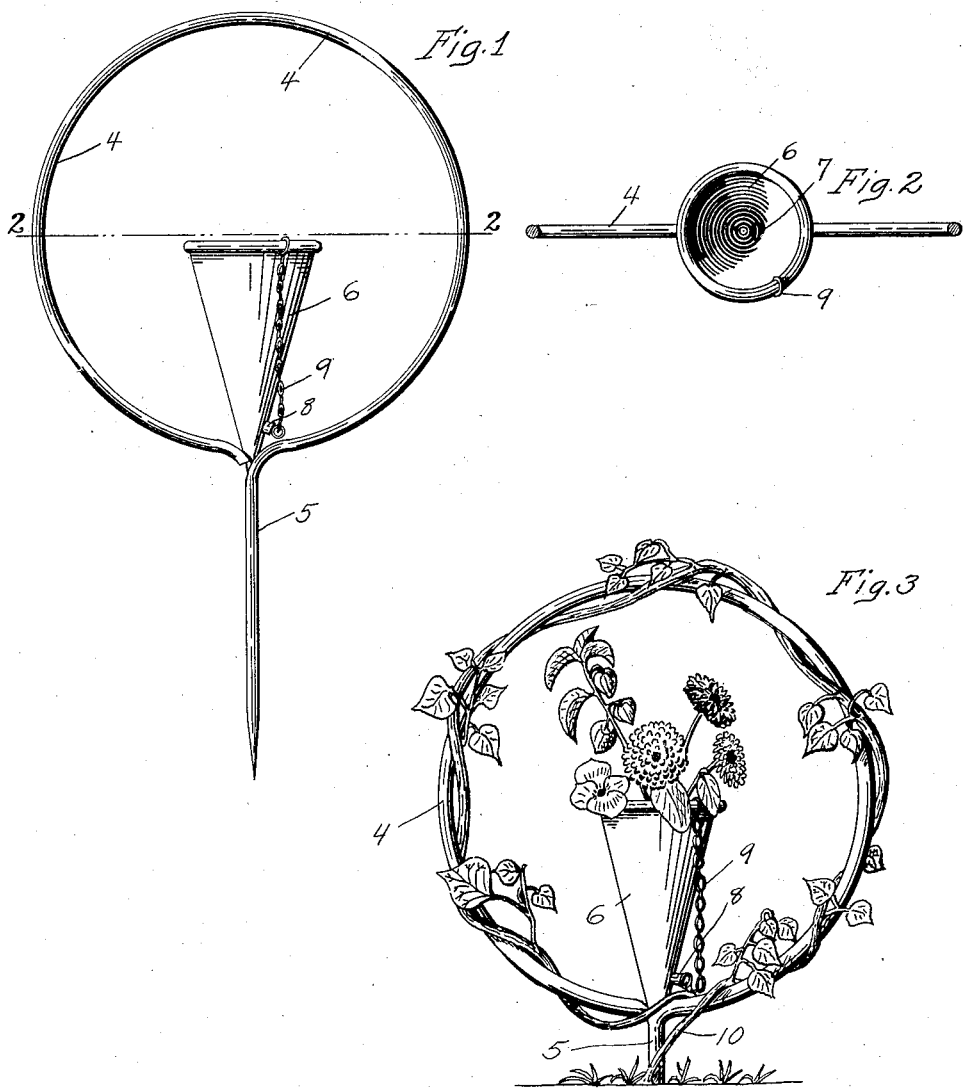

Patented Mar. 27, 1928.

1,664,019

UNITED STATES PATENT OFFICE.

JOSEPHINE W. BLACKMAN, OF NEW HAVEN, CONNECTICUT.

TRELLIS.

Application filed March 18, 1927. Serial No. 176,389.

This invention relates to improvement in trellises, and while particularly adapted for devices to be used in cemeteries, is equally applicable for use in houses and gardens. The object of the invention is to provide a device upon which a vine can be trained so as to produce a wreath-like effect, and to combine with such a device a vase for cut-flowers, and the invention consists in the construction as hereinafter described and particularly recited in the claim.

In the accompanying drawings:

Fig. 1 is a face view of a trellis constructed in accordance with my invention;

Fig. 2 is a sectional view on the line 2—2 of Fig. 1; and

Fig. 3 is a face view showing a trellis with a vine trained around it and with cut-flowers in the vase.

In carrying out my invention, I employ a ring 4 preferably formed from wire and with a prong 5 which may be pushed into the ground, so as to support the ring in a vertical position. At the junction of the ring with the stem, I mount a vase 6 preferably formed at its lower end with an outlet-opening 7 to receive a plug 8, which is preferably connected by a chain 9 with the rim of the vase, so as to prevent the plug from being lost. This device is inserted into the ground adjacent to the roots of a vine 10, and this vine is trailed around the ring so as to form a wreath, and the vase will hold water for cut-flowers.

The device may be formed in various sizes and the length of the stem will be in proportion to the size of the ring, so as to form a firm support for it. These devices can be produced at a low cost for manufacture and provide an attractive device particularly adapted for cemeteries, as a plant or vine in time will form a perfect wreath.

I claim:

The combination with a trellis, comprising a ring and a stem integral therewith, of a vase secured within the ring at the junction of the ring with the stem.

In testimony whereof, I have signed this specification.

JOSEPHINE W. BLACKMAN.